Dec. 30, 1952
G. W. DENISON
2,623,382
METHOD OF MAKING FACED COLORED BRICKS
AND BUILDING WALLS THEREFROM
Filed Jan. 23, 1946
3 Sheets-Sheet 1
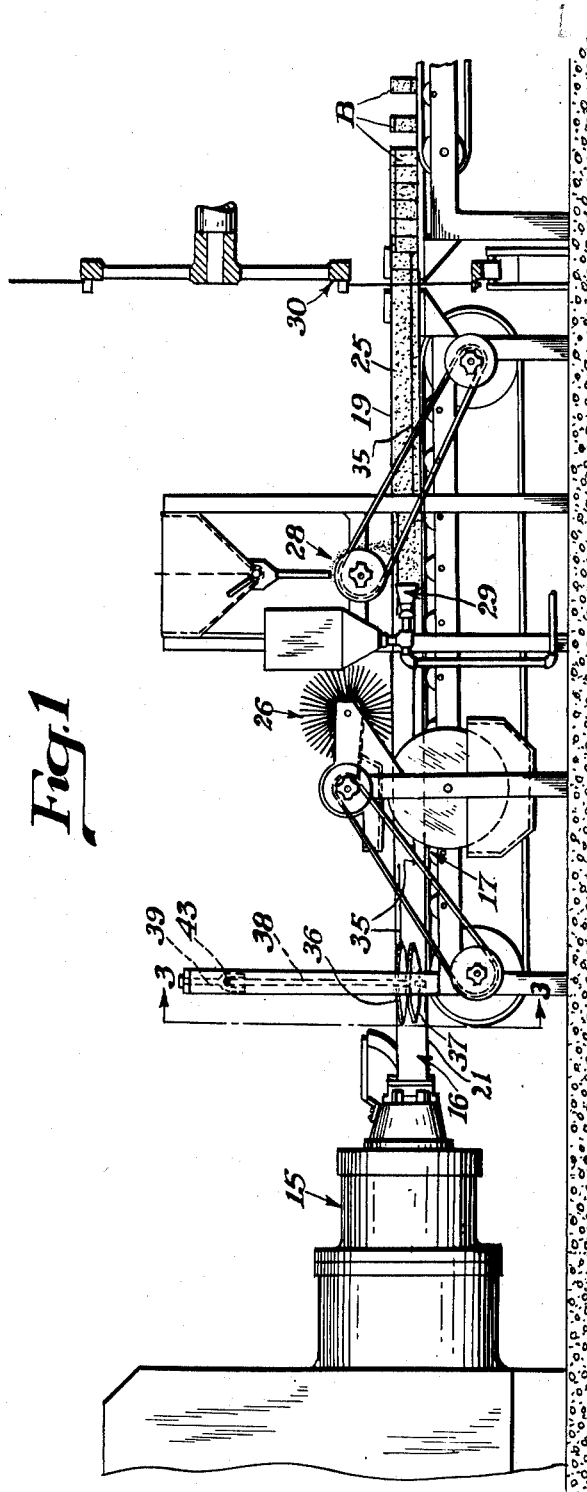
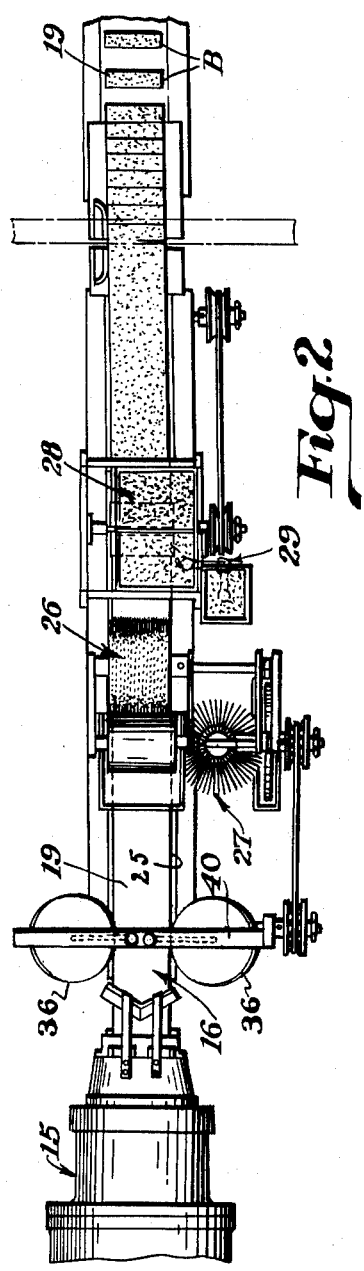
INVENTOR.
GEORGE W. DENISON.
BY
Fay, Golrick & Chitton.
Attorneys.

Dec. 30, 1952 G. W. DENISON 2,623,382
METHOD OF MAKING FACED COLORED BRICKS
AND BUILDING WALLS THEREFROM
Filed Jan. 23, 1946 3 Sheets-Sheet 2
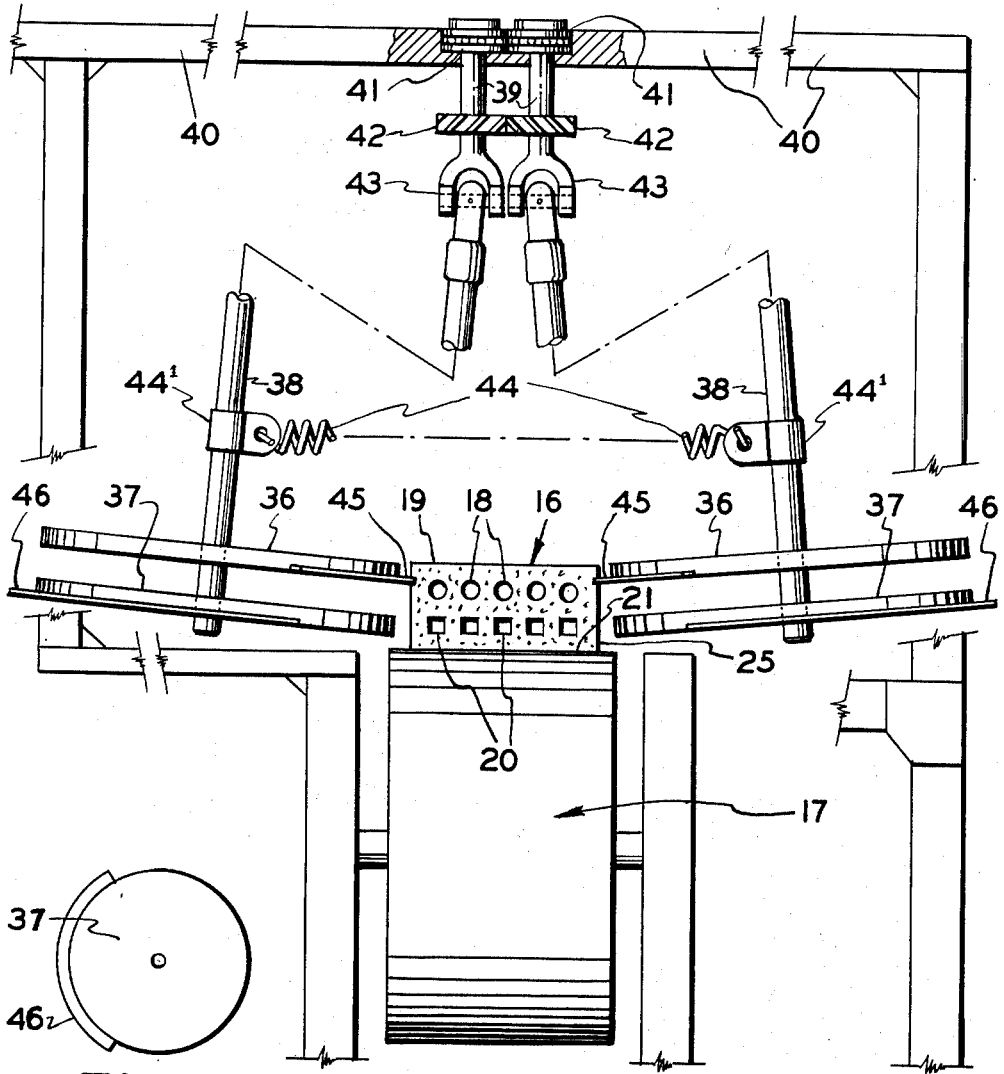
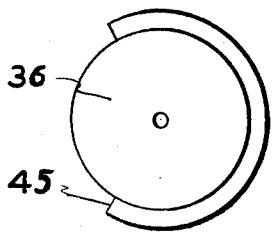
FIG. 11    FIG. 3
FIG. 12
INVENTOR
GEORGE W. DENISON.
BY
Fay, Golrick & Chilton.
ATTORNEYS.

Dec. 30, 1952 G. W. DENISON 2,623,382
METHOD OF MAKING FACED COLORED BRICKS
AND BUILDING WALLS THEREFROM
Filed Jan. 23, 1946 3 Sheets-Sheet 3
Fig. 10
Fig. 9
Fig. 4
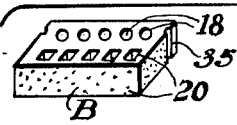
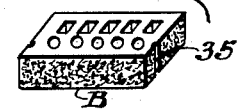
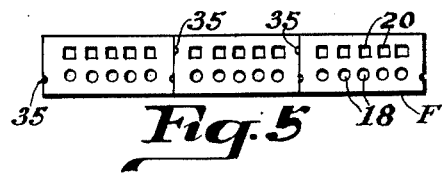
Fig. 5
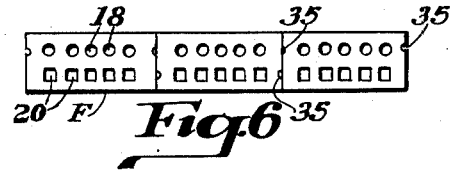
Fig. 6
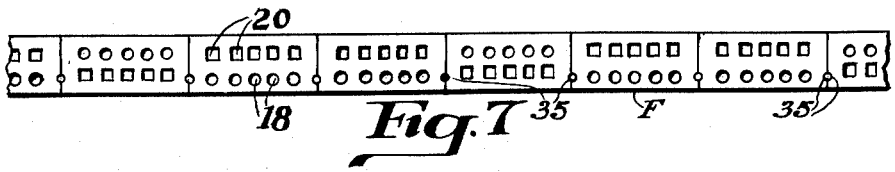
Fig. 7
Fig. 8
INVENTOR.
GEORGE W. DENISON.
BY
Fay, Gobrick & Chilton.
Attorneys.

Patented Dec. 30, 1952

2,623,382

UNITED STATES PATENT OFFICE 2,623,382

METHOD OF MAKING FACED COLORED BRICKS AND BUILDING WALLS THEREFROM

George W. Denison, Bay Village, Ohio

Application January 23, 1946, Serial No. 642,884

3 Claims. (Cl. 72—37)

The present invention relates to a method of forming a plurality of walls of similarly colored brick or tile, which walls each have a pleasing, distinctive appearance, and to apparatus for forming brick or tile or the like for forming such walls.

In building structures of brick or tile, it is often desirable to vary the appearance of certain walls or sections of walls by using different colored bricks. In some instances it is desirable to form a certain section of a wall of one shade of brick and to form another section or sections of the wall of brick having a different color. An example of such practice is where a panel effect is desired in a wall. Also, it is a practice to design buildings having walls varying from dark to light, or the lower or central portions dark and the distant, horizontal or vertical portions becoming lighter. Another example of the desirability for color variation in buildings is where a number of buildings of similar exterior wall plans are constructed in a group. By varying the colors of the walls as between different buildings, the otherwise monotonous appearance of the buildings is avoided.

In order to obtain these different color tone effects, it has been necessary heretofore for the brick or tile manufacturer and the builder to have a relatively large inventory of bricks or tiles of different colors, and this invariably entailed the sorting of the bricks and the employment of a higher degree of skill in the manufacture of the bricks and tile and in the building of the structures, which in turn increase the costs of such structures.

An object of the present invention, therefore, is to provide a method of forming walls or wall sections of brick or tile, so that different colored wall sections may be formed of brick or tile that are all substantially similar in appearance and which may be produced from one manufacturing "run" and used without preselection from a common inventory.

A further object of the present invention is to provide an economical method whereby bricklayers may form a brick wall having a predetermined color tone effect throughout the wall merely by laying the bricks exposed as indicated by a varying indicator or code mark found on the bricks, the brick being positioned so that the indicator or variable code marking is in a definite relationship with the face of the wall, for example.

Another object of the invention is to provide a method by which a plurality of walls of the same general color may be formed by the method set forth in the preceding paragraph and each will have a distinctive color tone different from the color toning of the other walls.

In carrying out the invention I propose to form in one manufacturing "run" a sufficient number of building units, such as bricks, for example, to form a desired wall or walls, and which units have one color on one face and a different color on the opposite face. If desired, one face may be stained or slip finished in a color which is darker, for example, than the color of an opposite face of the brick. The bricks are formed by a brick making machine during which one type of mark is formed adjacent the face of the brick bearing one color and another distinctive mark is formed adjacent the opposite face of the brick. Also, as the bricks are formed, an identifying mark, referred to hereinafter as a percentage mark, is formed thereon so that out of each twenty-one bricks formed, for example, fourteen bricks will have the percentage mark adjacent one of the mentioned colored faces thereof and seven bricks will be formed having the percentage mark adjacent to the other of the mentioned faces. Thus, as an example, in a run of bricks, two-thirds of the bricks will have the percentage mark adjacent to the darker faces and one-third of the bricks will have the percentage mark adjacent the opposite, lighter colored faces. In handling the bricks in processing, transporting and storage, the bricks will be shuffled somewhat so that the exact order of formation of the bricks will be broken up. It is to be understood that the two-thirds and one-third proportion mentioned is merely illustrative and that any proportions may be used instead to produce desired appearances of different walls or wall sections. Then, in constructing the wall, the bricklayers lay each of the bricks with a particular identification mark consistently toward the front face of the wall, for example, and in this manner the wall may be constructed so that it will present a solidly colored face of either color of the opposite faces of the brick, or the wall may present a color shade resulting from a predetermined proportion of the brick being laid to show one color and appearing substantially uniformly throughout the wall and in contrast with bricks laid to show the color of the opposite faces of the brick. It will be apparent that by referring consistently to the percentage marks in laying the bricks a certain proportion of the faces of the bricks of one color will appear throughout the wall to give an overall predetermined color tone effect to the wall according to the position of the percentage marks relative to the wall face. By reversing the relationship of the percentage marks with the wall being formed, i. e., by placing such marks consistently to the rear face of the wall, a still different color tone effect of the wall will be produced which results from the reversal of the brick so that the opposite colored faces appear.

By this method it will be apparent that several different walls or sections thereof may be constructed of brick having identical coloring characteristics thereon, but the overall color tone of the walls may be varied perceptibly, and such varied walls may be constructed by workmen who are not required to exercise discrimination as to the shade or color of the brick faces to be exposed in the wall, and a common inventory may be maintained for many different building projects.

Other objects and advantages of the invention will be apparent from the following detailed description of a preferred form of the invention, reference being made to the accompanying drawings wherein—

Fig. 1 is a more or less diagrammatical side view of a brick making apparatus;

Fig. 2 is a top view of the apparatus shown in Fig. 1;

Fig. 3 is a view taken substantially along line 3—3 of Fig. 1, but on a larger scale;

Fig. 4 is a view in perspective of a brick formed by the apparatus shown in Figs. 1 to 3;

Fig. 5 is a top view of three bricks laid in a course to form part of a wall of a solid color;

Fig. 6 is a view similar to that of Fig. 5, but showing the bricks laid to form a wall of a different color;

Fig. 7 is a top view of a part of a wall showing the bricks laid so that a substantially predetermined proportion of the outward faces will be of a certain color, the proportion being practically uniform throughout the wall;

Fig. 8 is a view similar to that of Fig. 7, but showing the bricks laid so that a different proportion of the certain colored brick faces appears throughout the wall;

Fig. 9 is a front view of a portion of the wall shown in Fig. 7;

Fig. 10 is a front view of a portion of the wall shown in Fig. 8; and

Figs. 11 and 12 show dies for forming indicator or percentage marks on the brick.

Although the invention may be practiced by various types of building units and various types of apparatus may be used for producing the building units, for the purpose of illustration, I have shown a preferred form of the invention in which four walls or wall sections may be formed each having a distinctive color and appearance and which may be made from brick produced in one manufacturing "run" and without preselection of the faces to be exposed by reference to the coloring of the brick faces.

Preferably, the brick are formed by an apparatus similar to that described in Patent 2,191,106. The apparatus includes a brick making machine 15 that is adapted to extrude a clay column 16, which column is received on a conveyor belt mechanism 17 and carried outwardly from the extruder at the same rate as extruding occurs and the column is subsequently severed to thereby form the individual bricks. Preferably, suitable dies are provided in the extrusion end of the pug mill for forming a series of longitudinally extending passages 18 of circular cross-section in the column adjacent to the top surface 19 and passages 20 of square cross-section similarly extending adjacent to the lower surface 21. The purpose of forming the passages of different cross-sectional forms will appear hereinafter.

The clay forming the column 16 is preferably of the type that, when burned in the usual brick treating process it will have a uniform, pleasing color. Preferably a wide and a narrow face of the column are treated so that when the bricks are processed, opposite sides and end faces will be of different shades or colors. In the form of the invention shown, this is accomplished by applying a suitable "slip" or stain to the top surface 19 and a side surface 25 of the column 16 by rotary brushes 26 and 27. This slip or stain can be sponged on instead of using rotary brushes. Sand of a type that will produce a desired color uniformly throughout the two faces when the bricks are burned, is applied over the "slip" by applicator mechanisms 28 and 29, which mechanisms are described in more detail in the patent referred to hereinbefore, and thereafter the the column is cut in the usual cutter 30 to form the bricks, which are indicated at B. The sand in the present instance is of a type that when the bricks are processed, it produces a color that is materially darker in shade than the color of the clay forming the column. If desired, the color may be obtained by applying a suitable stain to the column by spraying or by the brushes 26 and 27, and in that event it would not be necessary to apply a "slip" or sand, although sand may be applied over the stain. Thus, in the preferred form of the invention one side face and one end face of the finished brick will be of a light color and the opposite faces will be of a dark shade of the same color. It is to be understood, however, that the two sets of opposite faces may be of different colors, if desired. In practicing my invention, however, an end and side face of the bricks may be of a different texture than that of the other opposite faces so that a different appearance would be created.

Percentage marks 35 are formed on the column 16, preferably, but not necessarily, prior to the application of the "slip" and sand, or stain. These marks are applied in such a manner that as bricks are formed, a predetermined number thereof will have the mark located on each end thereof and adjacent the light colored side face and then the next predetermined number of bricks formed will have the percentage mark on each end thereof and adjacent the darker colored side face. The percentage marks are applied by a mechanism comprising two pairs of dies 36 and 37 which are rotatively suspended on two rods 38 at the sides of the column 16. The rods 38 are supported by two freely rotatable vertical shafts 39 supported on a cross-beam 40 by antifriction bearings 41. The shafts 39 are geared together by two similar meshing gears 42 so that the two shafts rotate at the same speeds. The shafts 39 are connected to rods 38 by universal joints 43, and the latter rods slope downwardly and outwardly and a tension spring 44 is attached at its ends to bushings 44' on the rods 38 so that the dies 36 and 37 will be pressed in contact with the sides of the column 16. The dies 36 each include an arcuate flange 45, and in the present instance the length of the periphery of which flange is equal to approximately the thickness of fourteen bricks and the dies 37 each have an arcuate flange 46 and the length of the periphery of this flange is equal to the thickness of seven bricks. It is to be understood that the dies 36 and 37 could be made of any desired dimensions so that they could mark a different number of bricks. For example, a die corresponding to die 36 could mark nine bricks and a die corresponding to die 37 could mark three bricks. The dies 36 and 37 are mounted on the rods 38 so that the flanges 45 engage opposite sides of the column 16 simultaneously and the flanges 46 also engage the sides of the column simultaneously, but during the time flanges 45 are out of engagement with the column. Preferably, means, not shown, are provided whereby the dies may be adjustably positioned on the rods and they may be removed and replaced by similar type dies having different dimensions. Thus, either flanges 45 or 46 are in engagement with the column, and the pressure of the dies against the column causes the slight indentation or percentage marks 35 to be formed in the column. These percentage marks are, in reality, very slight indentations so that they are practically unnoticeable to the casual observer. However, they afford a definite indicator to the bricklayer, and the marks shown in the drawings are exaggerated for the sake of clarity. The dies are rotated by the movement of the column and the percentage marks are thus formed alternately adjacent the top and bottom surfaces of the column. In this manner, of each group of twenty-one bricks formed, which is a small fraction of the total number of bricks formed in a run, fourteen will have the percentage mark 35 adjacent to the side face bearing darker color and seven bricks will have the mark 35 adjacent to the side faces bearing the lighter color.

After the bricks are cut, they are handled and processed in the manner usual in brick making. During the processing and shipping of the brick, and storage, the order of the bricks will be shuffled somewhat.

When it is desirable to build a wall of a solid dark color, for example, the bricklayers are instructed to lay the bricks with the circular openings 18 toward the outer face of the wall. This is illustrated in Fig. 5, wherein the front of the wall is indicated at F. Since the color of the faces of the bricks adjacent the circular openings will all be of a uniform color darker than the opposite face, the wall will have a solid dark color appearance. Similarly, if it is desired to form a wall having a solid light color, the bricklayers are instructed to lay the brick with the square openings 20 toward the front of the wall, as is illustrated in Fig. 6. Thus, the faces of the bricks bearing the lighter shade of color will all appear at the face of the wall.

When it is desired to produce a wall or wall section having a color slightly darker than the light colored faces, the bricks are laid so that substantially one-third of the brick faces appearing in the wall will be of the darker shade while two-thirds of the bricks will show the lighter colored faces. This may be accomplished by instructing the bricklayers to lay the bricks so that each percentage mark 35 will be away from the front face of the wall. In this case, the square and circular openings 18 and 20 are disregarded in positioning the bricks. Since one-third of the bricks will have the percentage mark adjacent to the light face thereof and the other two-thirds of the brick will have the mark adjacent to the dark colored faces and this ratio is the average throughout the brick run, the ratio of dark brick faces to the light faces appearing throughout the wall will be one to two. This is illustrated in Figs. 8 and 10 wherein, for the sake of illustration, two light colored brick faces show for each dark face. In actual practice this rigid pattern would not appear.

When it is desirable to produce a darker overall color effect in a wall or wall section, the bricklayers are instructed to lay the bricks as shown in Fig. 7 so that the percentage marks are all toward the front face of the wall. Thus, the proportion of the light and dark colored brick faces appearing in the front face will be reversed from that described in the preceding paragraph, and throughout the entire wall or wall section the ratio of light colored brick faces and dark colored faces appearing will be substantially one to two. This is illustrated in Fig. 9. As in Figs. 8 and 10, the dark brick will not appear in the wall face in the precise geometric order shown in Fig. 9.

As mentioned previously, shuffling of the bricks will occur in the processing and transportation of the "run" of the brick and this will break up rigid patterns that would otherwise be produced, thereby adding to the interesting appearance of the wall. However, the ratio of light and dark faces throughout the walls will average two to one or one to two, depending on the manner in which the bricks are laid with reference to the percentage marks.

It will be apparent that out of a single "run" of bricks and of a single inventory of bricks, four different appearing walls or wall sections can be formed without reliance on judgment of the bricklayer as to the particular faces of the bricks to be shown. Thus, the builder may achieve a variety of predetermined appearances in structures formed from a single stock pile of bricks and the judgment of the bricklayers as to the selection of the proper colored faces to be shown need not be relied upon. Thus, considerable savings in time, material and labor may be effected by the brick manufacturer and the builder utilizing the bricks.

It is to be understood that the invention contemplates many different forms and variations than those shown. For example, any suitable form of markers other than those shown can be employed by indicating the various colored faces of the bricks. These markers may, for example, take the form of impressions or openings or certain configurations in the bricks or they may consist of coloring matter suitably disposed to indicate a certain face. Also, two sets of percentage marks could be placed on the bricks, one set denoting one percentage and the other set denoting still another percentage. For example, in addition to the one-third – two-third percentage marks, a similar mark made adjacent to the marks 35 could indicate a 10%–90% proportion, i. e., out of each group of ten bricks, a mark would appear on one brick adjacent the light colored face thereof while the other nine bricks would have the mark adjacent the dark faces thereof. In that event, six different color combinations could be effected.

It is to be understood also, that the proportion of the bricks marked by the percentage marks 35 could be changed from that shown so that a variety in color tone effects of walls could be had as between different manufacturing "runs" of brick, if desired.

As pointed out hereinbefore, although I have described but one preferred form of my invention, other forms might be adopted, all falling within the scope of the claims which follow.

I claim:

1. In the art of making brick for deriving an artistic appearance of the surface of a building wall formed of such brick, the steps in producing the brick comprising—decorating one wide face of a rectangular shaped extruded clay column with a color which when baked is of a different tone than the tone of the opposite face of the baked brick, forming brick laying indicator marks longitudinally of the column along a narrow face of the column nearer the colored face of the column than to the opposite face and of a predetermined distance to include several ultimate brick units, similarly forming indicator marks along a narrow face of the column nearer to the opposite undecorated face than to the colored face and of a length to include a predetermined number of ultimate brick units, severing the marked column into brick units, drying and baking the severed units thereby producing a stock of brick during the routine manufacture thereof with a predetermined number of commingled brick units having the mark located nearer the colored face and a predetermined number of commingled brick units having the mark located nearer the opposite undecorated face of the brick unit whereby, when all of the brick units are laid in a wall structure with the indicator markings disposed in the wall in the same spaced relation to the outer surface of the wall irrespective of the tone of the brick unit face, a wall of a predetermined tonal appearance will be produced.

2. The art of producing a pleasing appearance of the outer surface of a brick wall, the step of utilizing a stock of brick with each brick having opposite faces of different colors and a laying indicator mark thereon located nearer one of the colored faces than the opposite face and wherein there is a predetermined commingled number of the brick with the mark located nearer one colored face than its opposite face and the remainder of the brick having the mark located nearer the said opposite face than the first named face, by taking the brick from the stock at random and the step of laying all the brick end to end in courses in the wall structure with substantially all of the indicator marks located in the same spaced relation to the outer surface of the wall irrespective of the particular colored brick face thus exposed whereby a wall of a predetermined appearance is produced without selecting the brick as to face color during the laying thereof.

3. In the art of making brick for deriving an artistic appearance of the surface of a building wall formed of such brick, the steps in producing the brick comprising decorating one wide face of an extruded clay column with a color which when baked is of a different tone than the natural tone of the opposite face of the baked unit, forming an indicator mark on a short face of the column to extend along the column closer to the colored column face than said opposite face a predetermined columnar distance to include several ultimate brick units, then similarly forming the indicator mark on the same short face along the column nearer the opposite undecorated face than the colored column face a distance which is greater than the column length of the first stated indicator mark and thereafter continuously alternatively forming the indicator marks on the short face of the column, then cutting the marked column into brick units in the usual manner and baking the brick units thereby producing a stock of mingled brick units with a predetermined percentage of the whole having the indicator mark nearer the colored face of the unit whereby a subsequent laying of the units in the building wall with all of the marks disposed in the same spaced relation toward the outer face of the wall irrespective of the tone of the brick unit face thus exposed will result in a wall of a predetermined tonal appearance.

GEORGE W. DENISON.

REFERENCES CITED

The following references are of record in the file of this patent:

UNITED STATES PATENTS

| Number | Name | Date |
|---|---|---|
| Re. 15,352 | Snyder | May 9, 1922 |
| 763,945 | Whitmore | June 28, 1904 |
| 1,541,429 | McMillan | June 9, 1925 |
| 1,761,631 | Keplinger et al. | June 3, 1930 |
| 1,773,857 | Porter | Aug. 26, 1930 |
| 1,910,496 | Parry | May 23, 1933 |
| 1,960,101 | Dunn | May 22, 1934 |
| 2,191,106 | Denison | Feb. 20, 1940 |
| 2,235,291 | Gaertner | Mar. 18, 1941 |

OTHER REFERENCES

Audel's Masons & Builders Guide No. 1. Pages 203–216, published by Theo Audel & Co., 1924.